United States Patent
Manabe et al.

(10) Patent No.: US 8,845,888 B2
(45) Date of Patent: Sep. 30, 2014

(54) WATER TREATMENT SYSTEM

(75) Inventors: Atsuyuki Manabe, Ehime (JP); Hayato Watanabe, Ehime (JP)

(73) Assignee: Miura Co., Ltd., Matsuyama (JP)

( * ) Notice: Subject to any disclaimer, the term of this patent is extended or adjusted under 35 U.S.C. 154(b) by 0 days.

(21) Appl. No.: 13/542,230

(22) Filed: Jul. 5, 2012

(65) Prior Publication Data

US 2013/0026083 A1    Jan. 31, 2013

(30) Foreign Application Priority Data

Jul. 27, 2011    (JP) ................................. 2011-164360

(51) Int. Cl.
| | |
|---|---|
| B01D 61/00 | (2006.01) |
| B01D 21/30 | (2006.01) |
| B01D 24/00 | (2006.01) |
| C02F 9/00 | (2006.01) |
| C02F 1/00 | (2006.01) |
| C02F 1/44 | (2006.01) |
| C02F 1/42 | (2006.01) |
| C02F 103/04 | (2006.01) |

(52) U.S. Cl.
CPC ............ *C02F 1/008* (2013.01); *C02F 2001/425* (2013.01); *C02F 1/42* (2013.01); *C02F 2209/02* (2013.01); *C02F 2303/16* (2013.01); *C02F 2209/005* (2013.01); *C02F 2209/003* (2013.01); *C02F 2209/40* (2013.01); *C02F 2209/055* (2013.01); *C02F 1/441* (2013.01); *C02F 2209/05* (2013.01); *C02F 2103/04* (2013.01); *C02F 2209/03* (2013.01)
USPC ........... 210/96.2; 210/96.1; 210/90; 210/143; 210/681; 210/258; 210/269; 210/190

(58) Field of Classification Search
USPC ......... 210/637, 638, 660, 661, 662, 670, 678, 210/681, 687, 739, 741, 742, 90, 96.1, 96.2, 210/87, 141, 142, 190, 191, 269, 258, 143
See application file for complete search history.

(56) References Cited

U.S. PATENT DOCUMENTS 3,870,596 A * 3/1975 Asadea et al. ............. 162/157.7
5,007,994 A * 4/1991 Snee ............................ 204/240

(Continued)

FOREIGN PATENT DOCUMENTS

| JP | A-2005-296945 | 10/2005 |
| JP | A-2010-082610 | 4/2010 |

OTHER PUBLICATIONS

U.S. Department of the Interior; "USGS Water-Quality Information_Water and Alkalinity"; Accessed Jan. 15, 2009; p. 1.*

*Primary Examiner* — Nam Nguyen
*Assistant Examiner* — Richard Gurtowski
(74) *Attorney, Agent, or Firm* — Oliff PLC

(57) ABSTRACT

According to one embodiment, a water treatment system includes: a membrane separation device and a water softening device including a valve unit switching between a softening process in which soft water is obtained by passing raw water through a cation exchange resin bed downward and a regeneration process in which a whole of the cation exchange resin bed is regenerated by generating an opposite flow of a regenerant by supplying the regenerant from both sides of a top portion and a bottom portion of the cation exchange resin bed and collecting a liquid at an intermediate portion of the cation exchange resin bed, and a regenerant supply supplying the regenerant in a volume which gives a regeneration level of 1 to 6 eq/L-R, to a hardness leakage prevention region set in a predetermined depth on the bottom portion of the cation exchange resin bed, in the regeneration process.

17 Claims, 12 Drawing Sheets

(56) References Cited

U.S. PATENT DOCUMENTS

| | | | |
|---|---|---|---|
| 6,331,261 B1 * | 12/2001 | Waatti et al. | 252/184 |
| 6,607,668 B2 * | 8/2003 | Rela | 210/321.6 |
| 6,929,748 B2 * | 8/2005 | Avijit et al. | 210/652 |
| 2005/0139530 A1 * | 6/2005 | Heiss | 210/85 |
| 2007/0227976 A1 * | 10/2007 | Furukawa et al. | 210/662 |
| 2007/0295650 A1 * | 12/2007 | Yoneda et al. | 210/97 |

* cited by examiner

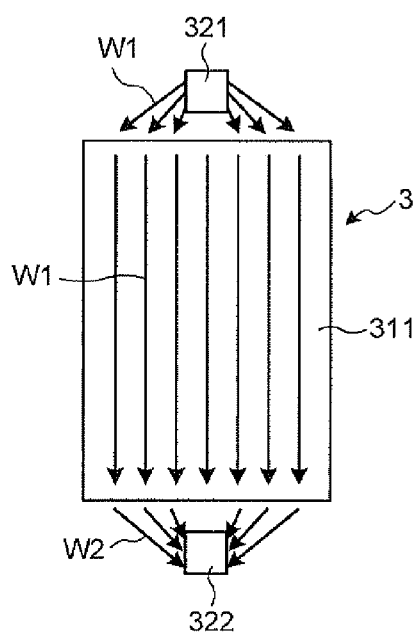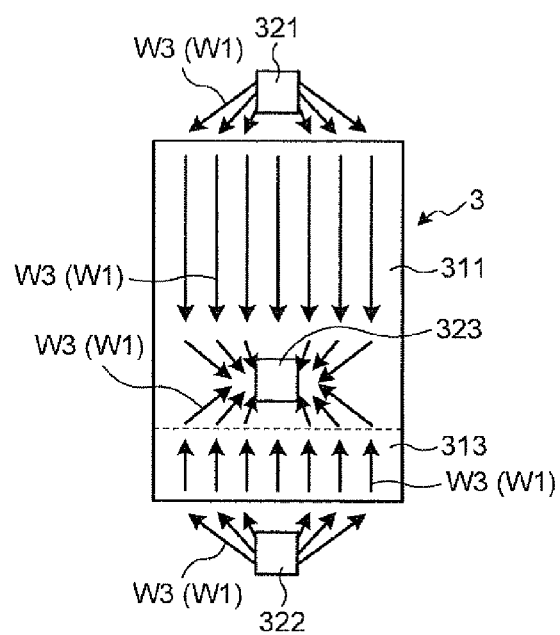

WATER TREATMENT SYSTEM

CROSS-REFERENCE TO RELATED APPLICATION(S)

This application is based upon and claims the benefit of priority from Japanese Patent Application No. 2011-164360, filed Jul. 27, 2011, the entire contents of which are incorporated herein by reference.

FIELD

The present invention relates to a water treatment system.

BACKGROUND

In a semiconductor manufacturing process, washing of electronic parts, and washing of medical apparatuses, high-purity pure water that does not contain impurities is used. In general, this type of pure water is produced by processing raw water, such as groundwater and tap water, with a reverse osmosis membrane (hereinafter, also an "RO membrane").

At the time of producing pure water with an RO membrane, there occurs a phenomenon that a hardness component contained in raw water is precipitated as a scale on a surface of the RO membrane. Further, there also occurs a phenomenon of what is called fouling that a suspended substance (colloidal iron in an insolubilized state, for example) contained in the raw water is deposited on a surface of the RO membrane or within pores. When precipitation of a scale and fouling occur on the RO membrane, permeability (water permeability coefficient) of the RO membrane decreases. As a result, a flow rate of permeate water decreases.

To suppress precipitation of a calcium carbonate scale, a system that supplies soft water to the RO membrane is being proposed. This system softens raw water (hard water), by a water softening device that uses a cation exchange resin as a preprocessing of the RO device.

On the other hand, in an RO membrane in a state that precipitation of a scale and fouling are not generated, a water permeability coefficient changes based on a temperature of water that is supplied (hereinafter, "supply water"). The water permeability coefficient of the RO membrane becomes larger when a temperature of the supply water is higher. Therefore, even when the supply water is supplied to the RO membrane at a constant pressure, a flow rate of permeate water increases when a temperature becomes higher. When the flow rate of the permeate water increases, concentration of soft water proceeds at a primary side of the RO membrane.

In general, a water softening device cannot remove a silica component and a suspended substance that are contained in raw water. Therefore, when concentration of soft water proceeds at a primary side of an RO membrane, precipitation of a silica scale and fouling easily occur. That is, when soft water is added to the RO membrane, the occurrence of precipitation of a silica scale and fouling cannot be suppressed depending on a temperature, even when precipitation of a calcium carbonate scale can be suppressed.

To keep constant a flow rate of permeate water in the RO membrane regardless of a temperature of supply water, a system that controls a flow rate feedback is being proposed. According to this flow rate feedback control, an operation frequency of a pressure pump that delivers supply water to the RO membrane is controlled by an inverter equipment such that a flow rate of permeate water that is produced by the RO membrane becomes a target value.

However, according to the conventional water softening device, it is difficult to produce high-purity soft water from which a hardness leakage level is sufficiently decreased, by using hard water of poor water quality. Further, according to the conventional water softening device, it is difficult to secure a practical water collection volume, even when high-purity soft water can be produced from hard water of poor water quality. Therefore, it is difficult to stably suppress precipitation of a calcium carbonate scale in the RO membrane.

SUMMARY OF THE INVENTION

A water treatment system, comprises: a water softening device configured to produce soft water from raw water; and a membrane separation device configured to produce permeate water from the soft water, wherein the water softening device comprises a cation exchange resin bed to which the raw water or a regenerant is supplied, a valve unit configured to switch between a softening process in which the soft water is obtained by passing the raw water through the cation exchange resin bed downward and a regeneration process in which a whole of the cation exchange resin bed is regenerated by generating an opposite flow of the regenerant by supplying the regenerant from both sides of a top portion and a bottom portion of the cation exchange resin bed and collecting a liquid at an intermediate portion of the cation exchange resin bed, and a regenerant supply unit configured to supply the regenerant in a volume which gives a regeneration level of 1 to 6 eq/L-R, to a hardness leakage prevention region set in a predetermined depth on the bottom portion of the cation exchange resin bed, in the regeneration process, and the membrane separation device comprises a reverse osmosis membrane module configured to separate the soft water into the permeate water and concentrated water, a pressure pump configured to be driven at a rotation speed corresponding to an input drive frequency and to intake the soft water to discharge the soft water toward the reverse osmosis membrane module, an inverter equipment configured to output the drive frequency corresponding to an input current value signal to the pressure pump, and a control unit configured to calculate the drive frequency of the pressure pump by using a physical quantity in the water treatment system such that a flow rate of the permeate water becomes a preset target flow rate value and to output a current value signal corresponding to a calculated value of the drive frequency to the inverter equipment.

BRIEF DESCRIPTION OF THE DRAWINGS

FIGS. 4A and 4B are exemplary explanatory diagrams showing a basic process that is performed by the control unit in the embodiment;

DETAILED DESCRIPTION

Embodiments described herein relate to a water treatment system that includes a water softening device and a reverse osmosis membrane separation device. An object of the embodiments is to provide a water treatment system that can stably suppress precipitation of a calcium carbonate scale, even when hard water of poor water quality is used, while suppressing the occurrence of precipitation of a silica scale and fouling in an RO membrane.

First Embodiment

Figure 1:
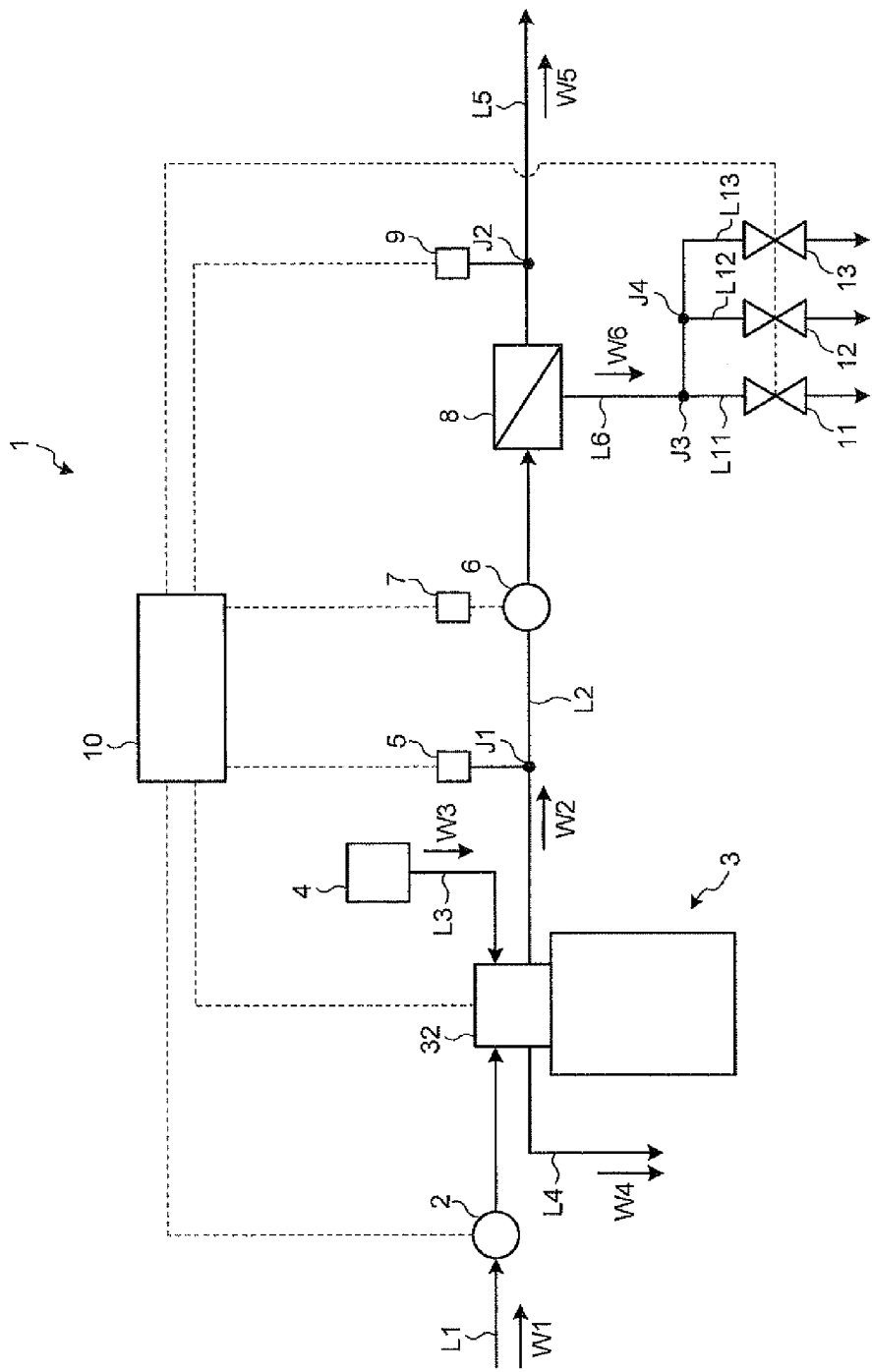
FIG. 1 is an exemplary overall configuration diagram of a water treatment system according to a first embodiment.
Figure 2:
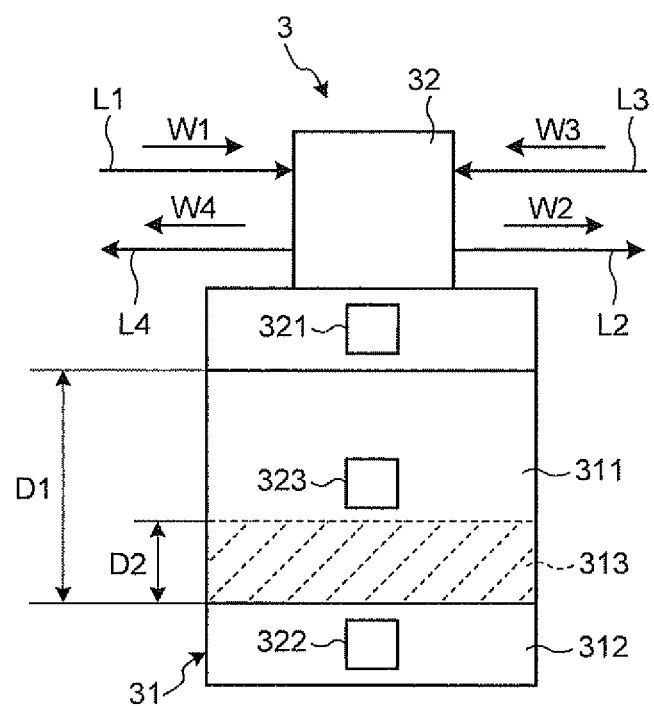
FIG. 2 is an exemplary schematic cross-sectional view of a water softening device in the embodiment.
Figure 3:
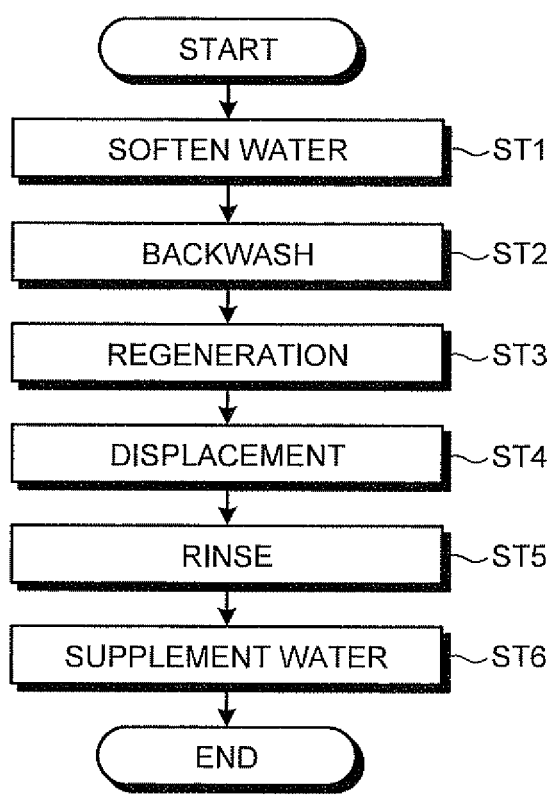
FIG. 3 is an exemplary flowchart of a process that is performed by a control unit in the embodiment.

A water treatment system 1 according to a first embodiment of the present invention is described with reference to the drawings. The water treatment system 1 is applied to a pure water production system that produces pure water from fresh water, for example. FIG. 1 is an overall configuration diagram of the water treatment system 1 according to the first embodiment. FIG. 2 is a schematic cross-sectional view of a water softening device 3. FIG. 3 is a flowchart of a process that is performed by a control unit 10. FIGS. 4A and 4B are explanatory diagrams showing a basic process that is performed by the control unit 10.

As shown in FIG. 1, the water treatment system 1 according to the first embodiment includes a raw water pump 2, the water softening device 3, a salt water tank 4 as a regenerant supply unit, and a temperature sensor 5 as a temperature detecting unit. The water treatment system 1 further includes a pressure pump 6, an inverter equipment 7, an RO membrane module 8 as a reverse osmosis membrane module, a flow rate sensor 9 as a flow rate detecting unit, the control unit 10, and a first drain valve 11 to a third drain valve 13. Out of these units, the pressure pump 6, the inverter equipment 7, the RO membrane module 8, the flow rate sensor 9, and the control unit 10 constitute a membrane separation device in the present embodiment. In FIG. 1, an electric connection path is shown by a broken line.

The water treatment system 1 also includes a raw water line L1, a soft water line L2, a salt water line L3, and a drain line L4. The water treatment system 1 further includes a permeate water line L5, and a concentrated water line L6. The "line" in the present specification is a generic term of a line through which a fluid can pass such as a flow path, a channel, and a duct.

An end portion of an upstream side of the raw water line L1 is connected to a supply source (not shown) of raw water W1. On the other hand, an end portion of a downstream side of the raw water line L1 is connected to a process control valve 32 (FIG. 2) of the water softening device 3.

The raw water pump 2 is provided in the raw water line L1. The raw water pump 2 pressure feeds the raw water W1 such as tap water and groundwater that is supplied from a supply source, to the water softening device 3. The raw water pump is electrically connected to the control unit 10. An operation (drive or stop) of the raw water pump 2 is controlled by the control unit 10.

In a softening process ST1, the raw water line L1 and the raw water pump 2 supply, to the water softening device 3, raw water W1 having an electric conductivity of equal to or lower than 150 mS/m and having a total hardness of equal to or lower than 500 mgCaCO$_3$/L.

The water softening device 3 is a facility that produces soft water W2, by displacing a hardness component (a calcium ion and a magnesium ion) contained in the raw water W1 into a sodium ion (or a potassium ion) by a cation exchange resin bed 311 (FIG. 2). As shown in FIG. 2, the water softening device 3 is configured by mainly a pressure tank 31 and the process control valve 32 as a valve unit.

The pressure tank 31 is a based cylindrical body having an upper opening portion. The pressure tank 31 has the opening portion sealed with a lid member. Inside the pressure tank 31, there are accommodated the cation exchange resin bed 311 including cation exchange resin beads, and a supporting bed 312 including filtration gravel.

The cation exchange resin bed 311 functions as a processing material that softens the raw water W1. The cation exchange resin bed 311 is stacked at an upper portion of the supporting bed 312, inside the pressure tank 31. A depth D1 of the cation exchange resin bed 311 is set within a range of 300 to 1500 mm.

The supporting bed 312 functions as a rectification member of a fluid to the cation exchange resin bed 311. The supporting bed 312 is accommodated at a bottom portion side of the pressure tank 31.

In the pressure tank 31, a top portion screen 321 that prevents flow out of the cation exchange resin beads is provided at a top portion of the cation exchange resin bed 311. The top portion screen 321 is connected via a first flow path (not shown) to each of various lines that constitute the process control valve 32.

A liquid distribution position and a liquid collection position by the top portion screen 321 are set near the top portion of the cation exchange resin bed 311. The top portion screen 321 functions as a top portion liquid distribution portion and a top portion liquid collection portion that are provided at the top portion of the cation exchange resin bed 311.

In the pressure tank 31, a bottom portion screen 322 that prevents flow out of the cation exchange resin beads is provided at a bottom portion of the cation exchange resin bed 311. The bottom portion screen 322 is connected via a second flow path (not shown) to each of various lines that constitute the process control valve 32.

A liquid distribution position and a liquid collection position by the bottom portion screen 322 are set near the bottom portion of the cation exchange resin bed 311. The bottom portion screen 322 functions as a bottom portion liquid distribution portion and a bottom portion liquid collection portion that are provided at the bottom portion of the cation exchange resin bed 311.

In the pressure tank 31, an intermediate portion screen 323 that prevents flow out of the cation exchange resin beads is provided, at an upper portion than a hardness leakage prevention region 313 (described later) and at an intermediate portion in a depth direction of the cation exchange resin bed 311. The intermediate portion screen 323 is connected via a third flow path (not shown) to each of various lines that constitute the process control valve 32.

A liquid collection position of the intermediate portion screen 323 is set near an intermediate portion of the cation exchange resin bed 311. The intermediate portion screen 323 functions as an intermediate portion liquid collection portion that is provided at an intermediate portion of the cation exchange resin bed 311.

The process control valve 32 includes various lines, valves, and the like inside thereof. The process control valve 32 is configured to be able to at least switch between a flow of the raw water W1 in the softening process ST1 and a flow of the salt water W3 in a regeneration process ST3. In the softening process ST1, the soft water W2 is produced by passing the raw water W1 in a downward flow form through the cation exchange resin bed 311. On the other hand, in the regeneration process ST3, an opposed flow, an opposite flow, a counter flow, or a countercurrent of the salt water W3 is generated by collecting a liquid at an intermediate portion while distributing a liquid from both sides of the top portion and the bottom portion of the cation exchange resin bed 311, and the whole of the cation exchange resin bed 311 is regenerated.

In the regeneration process ST3, the salt water W3 is supplied by a volume by which a regeneration level becomes 1 to 6 eq/L-R, to the hardness leakage prevention region 313. The regeneration level is a regeneration agent volume that is used to regenerate a cation exchange resin of a unit capacity. When sodium chloride is used as a regeneration agent, 1 eq corresponds to 58.5 g.

The hardness leakage prevention region 313 is a region that needs to be sufficiently regenerated in the cation exchange resin bed 311, to prevent as far as possible a hardness leakage in the softening process ST1. The hardness leakage prevention region 313 has a depth D2 of 100 mm, with a bottom portion (that is, a bottom surface) of the cation exchange resin bed 311 as a base, as shown in FIG. 2. In the regeneration process ST3, a hardness leakage level can be maintained at 0.8 mgCaCO$_3$/L or lower, by regenerating this limited region at a regeneration level of 1 to 6 eq/L-R.

Further, the process control valve 32 is configured to be able to switch a flow of the raw water W1 in a displacement process ST4 that is performed after the regeneration process ST3. In the displacement process ST4, an opposed flow of the raw water W1 is generated by collecting a liquid at the intermediate portion of the cation exchange resin bed 311 while distributing the raw water W1 from both sides of the top portion and the bottom portion of the cation exchange resin bed 311, and the salt water W3 introduced is displaced.

An end portion of an upstream side of the drain line L4 is connected to the process control valve 32. The salt water W3 and the raw water W1 that are used in the regeneration process ST3 and the displacement process ST4 are drained as drain water W4, from the drain line L4.

Further, in the process control valve 32, a drive unit of a valve element provided inside thereof is electrically connected to the control unit 10 via a signal line. Switching of a valve of the process control valve 32 is controlled by the control unit 10.

Each process performed by the water softening device 3 is described next. In the water treatment system 1 according to the present embodiment, the control unit 10 described later performs operations of processes ST1 to ST6 shown in FIG. 3, by switching a flow path of the process control valve 32.

ST1: A softening process of passing the raw water W1 through the whole of the cation exchange resin bed 311 downwards in the vertical direction.

ST2: A backwash process of passing the raw water W1 as wash water through the whole of the cation exchange resin bed 311 upwards in the vertical direction.

ST3: A regeneration process of passing the salt water W3 as a regenerant through the cation exchange resin bed 311 downwards in the vertical direction, and also passing the raw water W1 mainly through the hardness leakage prevention region 313 of the cation exchange resin bed 311 upwards in the vertical direction.

ST4: A displacement process of passing the raw water W1 as displacing water through the cation exchange resin bed 311 downwards in the vertical direction, and also passing the raw water W1 mainly through the hardness leakage prevention region 313 of the cation exchange resin bed 311 upwards in the vertical direction.

ST5: A rinse process of passing the raw water W1 as rinse water through the whole of the cation exchange resin bed 311 downwards in the vertical direction.

ST6: A water supplementing process of supplying the raw water W1 as supplementary water to the salt water tank 4.

Out of the processes ST1 to ST6, an operation method of the softening process ST1, the regeneration process ST3, and the displacement process ST4 as main processes is described next.

In the softening process ST1, the soft water W2 is produced, by distributing the raw water W1 from the top portion screen 321, and by passing the raw water W1 in a downward flow form through the whole of the cation exchange resin bed 311, as shown in FIG. 4A. The produced soft water W2 is collected from the bottom portion screen 322. In the softening process ST1 after the regeneration process ST3, the raw water W1 having an electric conductivity of 150 mS/m or lower and having a total hardness of 500 mgCaCO$_3$/L or lower is supplied.

In the regeneration process ST3, as shown in FIG. 4B, the salt water W3 is distributed from the top portion screen 321, and the salt water W3 is passed in a downward flow form through the cation exchange resin bed 311. At the same time, the salt water W3 is distributed from the bottom portion screen 322, and the salt water W3 is passed by an up flow to the cation exchange resin bed 311. With this arrangement, an opposed flow of the salt water W3 is generated, and the cation exchange resin bed 311 is generated. In the regeneration process ST3, the salt water W3 is passed to the cation exchange resin bed 311 at a linear velocity of 0.7 to 2 m/h. The salt water W3 in a volume which gives a regeneration level of 1 to 6 eq/L-R is supplied to the hardness leakage prevention region 313.

The salt water W3 used after regenerating the cation exchange resin bed 311 is collected from the intermediate portion screen 323. In the regeneration process ST3, the whole of the cation exchange resin bed 311 is regenerated by a split-flow regeneration of generating an opposed flow of the salt water W3. Particularly, in the split-flow regeneration according to the present embodiment, because the salt water W3 of a volume that becomes a specific regeneration level is supplied to the hardness leakage prevention region 313 cation exchange resin, a lower-side region of the cation exchange resin bed 311 including the hardness leakage prevention region 313 can be sufficiently regenerated.

In the displacement process ST4 that is performed after the regeneration process ST3, as shown in FIG. 4B, the raw water W1 is distributed from the top portion screen 321, and the raw water W1 is passed in a downward flow form through the cation exchange resin bed 311. At the same time, the raw water W1 is also distributed from the bottom portion screen 322, and the raw water W1 is passed by an up flow to the cation exchange resin bed 311. With this arrangement, an opposed flow of the raw water W1 is generated, and the salt water W3 introduced to the cation exchange resin bed 311 is displaced. The raw water W1 that passes the cation exchange resin bed 311 is collected from the intermediate portion screen 323. In the displacement process ST4, the raw water W1 is passed to the cation exchange resin bed 311 at a linear velocity of 0.7 to 2 m/h and by a displacement volume of 0.4 to 2.5 BV.

In the regeneration process ST3, a split-flow regeneration is performed to the whole of the cation exchange resin bed 311. Therefore, although the whole of the cation exchange resin bed 311 is substantially uniformly regenerated, particularly a lower-side region that includes the hardness leakage prevention region 313 can be sufficiently regenerated. Accordingly, in the softening process ST1, a water collection volume of the soft water W2 in high purity can be increased to a maximum limit. In the split-flow regeneration, a displacement volume is limited, while using the raw water to displace a regeneration agent. Consequently, the soft water W2 of target purity having little contamination of the hardness leakage prevention region 313 can be produced.

By performing the regeneration process ST3, in the subsequent softening process ST1, high-purity soft water W2 having a hardness leakage level of equal to or lower than 0.8 mgCaCO3/L can be produced, when the raw water W1 having an electric conductivity of equal to or lower than 150 mS/m and having a total hardness of equal to or lower than 500 mgCaCO$_3$/L is supplied.

The backwash process ST2, the rinse process ST5, and the water supplementing process ST6 are not described with reference to drawings.

A configuration of the water treatment system 1 is described with reference to FIG. 1 again.

The salt water tank 4 stores the salt water W3 for regenerating the cation exchange resin bed 311. An end portion of an upstream side of the salt water line L3 is connected to the salt water tank 4. An end portion of a downstream side of the salt water line L3 is communicated to the process control valve 32, and is connected to each of various lines that constitute the process control valve 32.

A salt water valve (not shown) is provided in the salt water line L3. The salt water valve opens and closes the salt water line L3. The salt water valve is built in the process control valve 32. In the salt water valve, a drive unit of a valve element is electrically connected to the control unit 10 via a signal line (not shown). Opening and closing of the salt water valve is controlled by the control unit 10. In the regeneration process ST3, the salt water W3 for regenerating the cation exchange resin bed 311 is delivered from the salt water tank 4 to the pressure tank 31.

The temperature sensor 5 is a device that detects a temperature of the soft water W2 which passes through the soft water line L2. The temperature sensor 5 is connected to the soft water line L2 at a junction portion J1. The temperature sensor 5 is also electrically connected to the control unit 10. A temperature (hereinafter, also a "detected temperature value") of the soft water W2 detected by the temperature sensor 5 is transmitted to the control unit 10 as a detection signal.

The pressure pump 6 is a device that takes in the soft water W2 delivered from the water softening device 3, and discharges the soft water W2 to the RO membrane module 8. The pressure pump 6 is electrically connected to the inverter equipment 7 (described later). Frequency-converted drive power is supplied from the inverter equipment 7 to the pressure pump 6. The pressure pump 6 is driven at a rotation speed corresponding to an input drive frequency.

The inverter equipment 7 is an electric circuit that supplies the frequency-converted drive power to the pressure pump 6. The inverter equipment 7 is electrically connected to the control unit 10. A current value signal is input to the inverter equipment 7 from the control unit 10. The inverter equipment 7 outputs a drive frequency corresponding to an input current value signal to the pressure pump 6.

The RO membrane module 8 is a facility that performs a membrane separation process of separating the soft water W2 produced by the water softening device 3 into permeate water W5 from which dissolved salt is removed and concentrated water W6 in which dissolved salt is concentrated. The RO membrane module 8 includes single or plural RO membrane elements (not shown). The RO membrane module 8 performs a membrane separation process of the soft water W2 by the RO membrane elements, and produces the permeate water W5 and the concentrated water W6. A primary-side input port of the RO membrane module 8 is connected to a downstream side of the water softening device 3 (process control valve 32) via the soft water line L2.

An end portion of an upstream side of the permeate water line L 5 is connected to a secondary-side port of the RO membrane module 8. The permeate water W5 obtained by the RU membrane module 8 is delivered to demand portions via the permeate water line L5. An end portion of an upstream side of the concentrated water line L6 is connected to a primary-side exit port of the RO membrane module 8. The concentrated water W6 obtained by the RO membrane module 8 is discharged to the outside of the RO membrane module 8 via the concentrated water line L6. A first drain valve 11, a second drain valve 12, and a third drain valve 13 (described later) are connected to a downstream side of the concentrated water line L6.

It may be arranged such that a part of the concentrated water W6 discharged from the concentrated water line L6 is refluxed to the soft water line L2 at an upstream side of the pressure pump 6. By refluxing a part of the concentrated water W6 to the soft water line L2, a water flow rate on a surface of the RO membrane module 8 can be maintained within a predetermined range.

The RO membrane module 8 according to the present embodiment has a reverse osmosis membrane (not shown) on a surface of which a skin layer of a negative electric characteristic made of a bridged wholly aromatic polyamide is formed. This reverse osmosis membrane has performance to increase a water permeability coefficient to $1.5 \times 10^{-11}$ $m^3 \cdot m^{-2} \cdot s^{-1} \cdot Pa^{-1}$ or higher and also to increase a salt rejection rate to 99% or higher, when a sodium chloride aqueous solution of concentration 500 mg/L, pH 7.0, and a temperature 25° C. is supplied at an operating pressure 0.7 MPa, and a recovery rate 15%.

The reverse osmosis membrane which is set to have this performance has a larger salt rejection rate (that is, [supply water EC]−[permeate water EC])/[supply water EC]×100) evaluated by electric conductivity (EC), when hardness of the supply water is lower, in a desalination process of fresh water. Therefore, a high salt rejection rate (usually, equal to or higher than 98.5%) can be maintained, by constantly supplying high-purity soft water W2 (raw power value equal to or lower than 0.8 mgCaCO$_3$/L) produced by the water softening device 3 that performs a split-flow regeneration.

The operating pressure is an average operating pressure that is defined by JIS K3802-1995 "Technical terms for membranes and membrane processes". The operating pressure refers to an average value of an input pressure at a primary side and an exit pressure at a primary side of the RO membrane module 8. The recovery rate refers to a proportion of a flow rate value $Q_p$ of permeate water to a flow rate $Q_f$ of supply water (sodium chloride aqueous solution, in this case) to the RO membrane module 8 (that is, $Q_p/Q_f \times 100$).

The water permeability coefficient is a value obtained by dividing a flow rate [m³/s] of permeate water by a membrane area [m²] and an effective pressure [Pa] (see Equation (3) described later). The water permeability coefficient is an index that indicates permeability performance of water of a reverse osmosis membrane. That is, the water permeability coefficient means a volume of water that permeates a unit area of a membrane per unit time when a unit effective pressure is operated. The effective pressure is defined by JIS K3802-1995 "Technical terms for membranes and membrane processes". The effective pressure is a pressure obtained by subtracting an osmotic pressure difference and a secondary-side pressure (back pressure) from the operating pressure (average operating pressure) (see Equation (4) described later).

The salt rejection rate is a value obtained from a calculation of concentration of specific salt (concentration of sodium chloride, in this case) before and after permeating a membrane. The salt rejection rate is an index that indicates block performance of dilute of a reverse osmosis membrane. The salt rejection rate is obtained from $(1-C_p/C_f) \times 100$, based on concentration $C_f$ of supply water and concentration $C_p$ of permeate water.

A reverse osmosis membrane that satisfies a condition of a water permeability coefficient and a salt rejection rate according to the present embodiment is commercially available as a reverse osmosis membrane element. For the reverse osmosis membrane element, a type name "TMG20-400" manufactured by Toray Industries, Inc., a type name "RE8040-BLF" manufactured by Woongjin Chemical Co., Ltd., and a type name "ESPA1"manufactured by Nitto Denko Corporation, for example, can be used.

The flow rate sensor 9 is a device that detects a flow rate of the permeate water W5 which passes through the permeate water line L5. The flow rate sensor 9 is connected to the permeate water line L5 at a junction portion 32. The flow rate sensor 9 is electrically connected to the control unit 10. The flow rate of the permeate water W5 detected by the flow rate sensor 9 (hereinafter, also a "detected flow rate value") is transmitted to the control unit 10 as a detection signal.

The first drain valve 11 to the third drain valve 13 are valves for adjusting a discharge flow rate of the concentrated water W6 discharged from the concentrated water line L6. A downstream side of the concentrated water line L6 is branched to a first drain line L11, a second drain line L12, and a third drain line L13, at junction portions J3 and 34.

The first drain valve 11 is provided in the first drain line L11. The second drain valve 12 is provided in the second drain Line L12. The third drain valve 13 is provided in the third drain line L13.

The first drain valve 11 can be operated to open and close the first drain line L11. The second drain valve 12 can be operated to open and close the second drain line L12. The third drain valve 13 can be operated to open and close the third drain line L13.

The first drain valve 11 to the third drain valve 13 include constant flow rate valve mechanisms (not shown) respectively. The constant flow rate valve mechanisms are set to mutually different flow rate values in the first drain valve 11 to the third drain valve 13, respectively. For example, the first drain valve 11 has a drain flow rate set such that a recovery rate of the RO membrane module 8 becomes 95% in an open state. The second drain valve 12 has a drain flow rate set such that a recovery rate of the RO membrane module 8 becomes 90% in an open state. The third drain valve 13 has a drain flow rate set such that a recovery rate of the RO membrane module 8 becomes 80% in an open state.

A drain flow rate of the concentrated water W6 discharged from the concentrated water line L6 can be adjusted at stages by selectively opening and closing the first drain valve 11 to the third drain valve 13. For example, only the second drain valve 12 is set to an open state, and the first drain valve 11 and the third drain valve 13 are set to a closed state. In this case, a recovery rate of the RO membrane module 8 can be set to 90%. Further, the first drain valve 11 and the second drain valve 12 are set to an open state, and only the third drain valve 13 is set to a closed state. In this case, a recovery rate of the RO membrane module 8 can be set to 85%. Therefore, in the present embodiment, the drain flow rate of the concentrated water W6 can be adjusted for each 5% at stages at a recovery rate between 65% and 95%, by selectively opening and closing the first drain valve 11 to the third drain valve 13.

The first drain valve 11 to the third drain valve 13 are electrically connected to the control unit 10, respectively. Opening and closing of valve elements of the first drain valve 11 to the third drain valve 13 are controlled by a drive signal from the control unit 10.

The control unit 10 is configured by a microprocessor (not shown) that includes a CPU and a memory. The control unit 10 controls an operation of the process control valve 32, based on detection signals that are input from a soft water flow rate sensor and a salt water flow rate sensor (both not shown). The memory of the control unit 10 stores in advance a control program for performing an operation of the water softening device 3 according to the first embodiment. The CPU of the control unit 10 controls the process control valve 32 to sequentially switch the softening process ST1 to the water supplementing process ST6, following the control program that is stored in the memory.

The control unit 10 calculates a drive frequency of the pressure pump 6, by using the detected flow rate value of the permeate water W5 as a feedback value, such that a flow rate of the permeate water W5 becomes a target flow rate value that is set in advance. The control unit 10 outputs a current value signal corresponding to the calculated value of a drive frequency to the inverter equipment 7 (hereinafter, also "flow rate feedback water volume control"). The flow rate feedback water volume control is a control mode that is performed when a flow rate of the permeate water W5 is normally detected by the flow rate sensor 9.

Figure 5:
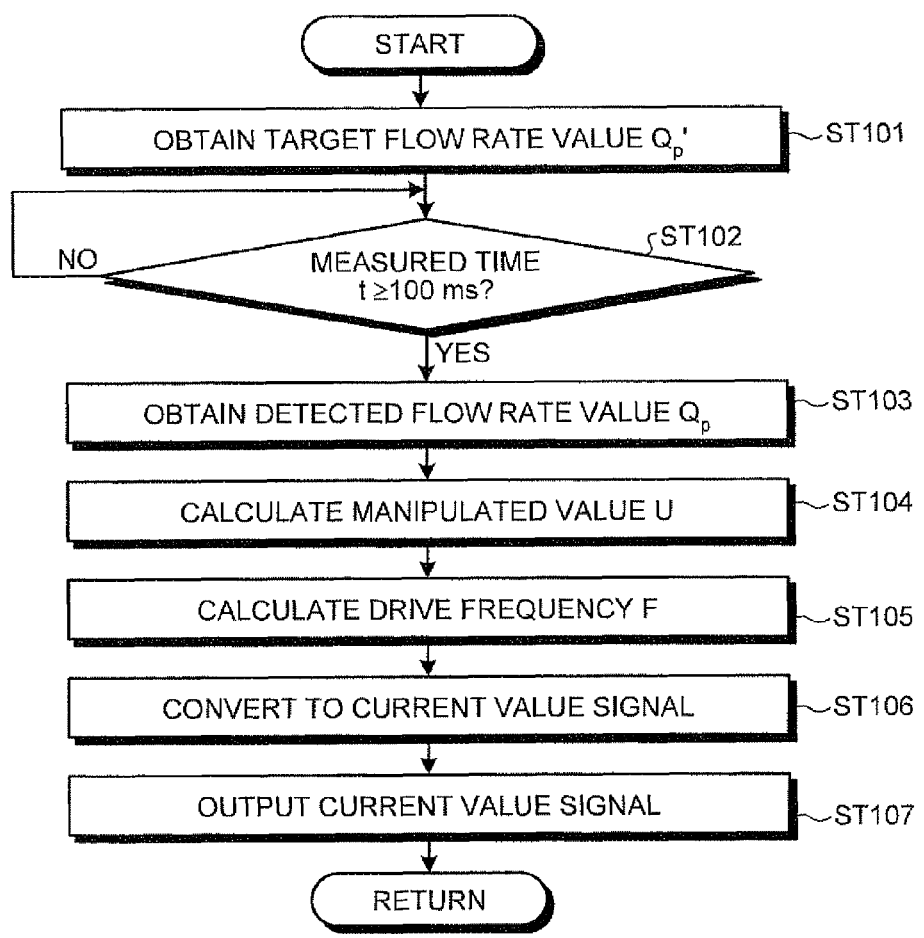
FIG. 5 is an exemplary flowchart showing a processing procedure employed when the control unit according to the first embodiment performs a flow rate feedback water volume control.

The flow rate feedback water volume control that is performed by the control unit 10 is described next. FIG. 5 is a flowchart showing a processing procedure employed when the control unit 10 performs the flow rate feedback water volume control. The process of the flowchart shown in FIG. 5 is repeatedly performed during an operation of the water treatment system 1.

In step ST101 shown in FIG. 5, the control unit 10 obtains a target flow rate value $Q_p'$ of the permeate water W5. The target flow rate value $Q_p'$ is a set value that a system manager inputs to the memory via a user interface (not shown), for example.

In step ST102, the control unit 10 determines whether or not a time t measured by an internal timer (not shown) has reached a control cycle of 100 ms. In step ST102, when the control unit 10 determines that a time measured by the timer has reached 100 ms (YES), the process proceeds to step ST103. In step ST102, when the control unit 10 determines that a time measured by the timer has not reached 100 ms (NO), the process returns to step ST102.

In step ST103 (step ST102; YES), the control unit 10 obtains the detected flow rate value $Q_p$ of the permeate water W5 detected by the flow rate sensor 9.

In step ST104, the control unit 10 calculates a manipulated value U by a speed type digital PID algorithm, such that a deviation between the detected flow rate (feedback value) $Q_p$ that is obtained in step ST103 and the target flow rate value $Q_p'$ that is obtained in step ST101 becomes zero. In the speed type digital PID algorithm, a change portion of a manipulated value is calculated for each control cycle (100 ms), and this is added to a manipulated value of a last time, thereby deciding a manipulated value of this time.

In step ST105, the control unit 10 calculates a drive frequency F of the pressure pump 6, based on the manipulated value U, the target flow rate value $Q_p'$, and a maximum drive frequency (set value of 50 Hz or 60 Hz) of the pressure pump 6.

In step ST106, the control unit 10 converts the calculated value of the drive frequency F into a corresponding current value signal (4 to 20 mA).

In step ST107, the control unit 10 outputs the converted current value signal to the inverter equipment 7. Accordingly, the process of the present flowchart ends (the process returns to step ST101).

The control unit 10 performs a recovery rate control of the permeate water W5, based on a temperature of the soft water W2 (hereinafter, also "temperature feedforward recovery rate control"). The temperature feedforward recovery rate control is performed in parallel with the flow rate feedback water volume control.

Figure 6:
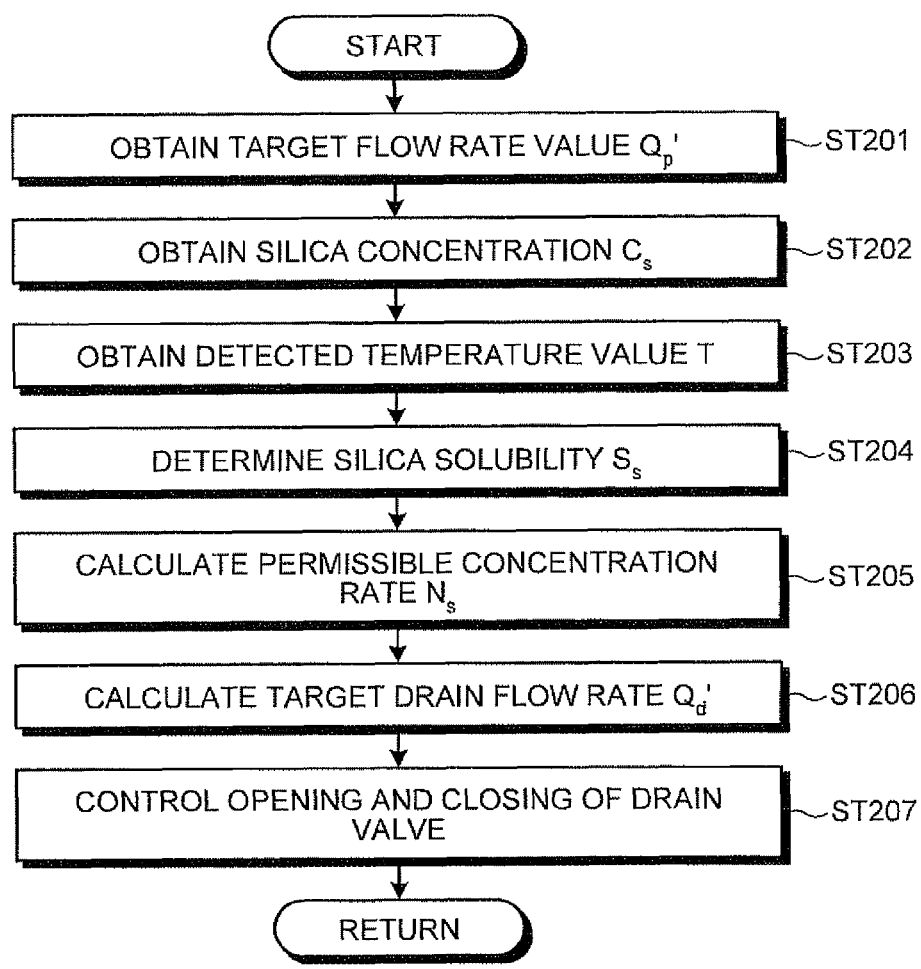
FIG. 6 is an exemplary flowchart showing a processing procedure employed when the control unit according to a second embodiment performs a temperature feedforward recovery rate control.

The temperature feedforward recovery rate control by the control unit 10 is described next. FIG. 6 is a flowchart showing a processing procedure employed when the control unit 10 performs the temperature feedforward recovery rate control. The process of the flowchart shown in FIG. 6 is repeatedly performed during an operation of the water treatment system 1.

In step ST201 shown in FIG. 6, the control unit 10 obtains the target flow rate value $Q_p'$ of the permeate water W5. The target flow rate value $Q_p'$ is a set value that the system manger inputs to the memory via the user interface (not shown), for example.

In step ST202, the control unit 10 obtains Silica ($SiO_2$) concentration $C_s$ of the soft water W2. The silica concentration $C_s$ is a set value that the system manger inputs to the memory via the user interface (not shown), for example. The silica concentration of the soft water W2 can be obtained by analyzing a water quality of the soft water W2 in advance. In the soft water line L2, the silica concentration of the soft water W2 may be measured by a sensor (not shown).

In step ST203, the control unit 10 obtains a detected temperature value T of the soft water W2 detected by the temperature sensor 5.

In step ST204, the control unit 10 determines the silica solubility $S_s$ in water, based on the obtained detected temperature value T.

In step ST205, the control unit 10 calculates a permissible concentration rate $N_s$ of silica in the concentrated water W6, based on the silica concentration $C_s$ and the silica solubility $S_s$ that are obtained or determined in the preceding step. The permissible concentration rate $N_s$ of silica can be obtained by the following Equation (1).

$$N_s = S_s / C_s \quad (1)$$

For example, when the silica concentration $C_s$ is 20 $mgSiO_2/L$ and also when the silica solubility $S_s$ at 25° C. is 100 $mgSiO_2/L$, the permissible concentration rate $N_s$ becomes "5".

In step ST206, the control unit 10 calculates a drain flow rate (target drain flow rate $Q_d'$) at which a recovery rate becomes a maximum, based on the target flow rate value $Q_p'$ and the permissible concentration rate $N_s$ that are obtained or calculated in the preceding step. The target drain flow rate $Q_d'$ can be obtained by the following Equation (2).

$$Q_d' = Q_p' / (N_s - 1) \quad (2)$$

In step ST207, the control unit 10 controls opening and closing of the first drain valve 11 to the third drain valve 13 such that an actual drain flow rate $Q_d$ of the concentrated water W6 becomes the target drain flow rate $Q_d'$ calculated in step ST206. Accordingly, the process of the present flowchart ends (the process returns to step ST201).

According to the water treatment system 1 according to the first embodiment, the following effect is obtained, for example.

In the water treatment system 1 according to the first embodiment, the cation exchange resin bed 311 of the water softening device 3 is operated to include the regeneration process ST3. In the regeneration process ST3, as shown in FIG. 43, the salt water W3 is distributed to each of the top portion screen 321 and the bottom portion screen 322 of the cation exchange resin bed 311, and is collected in the intermediate portion screen 323. Accordingly, an opposing flow of the salt water W3 is generated, and the whole of the cation exchange resin bed 311 is regenerated. Therefore, in the water treatment system 1, the high-purity soft water W2 from which a hardness leakage level is sufficiently decreased can be obtained at a maximum extent within a practical range of a water collection volume.

Further, in the water treatment system 1 according to the first embodiment, in the regeneration process ST3, the salt water W3 in which a regeneration level is 1 to 6 eq/L-R is supplied to the hardness leakage prevention region 313 that has the depth D2 (see FIG. 2) set to 100 mm with a bottom portion of the cation exchange resin bed 311 as a base. Therefore, in the cation exchange resin bed 311, the hardness leakage prevention region 313 as an exit region important to prevent a hardness leakage can be substantially completely regenerated. According to this, in the softening process ST1, even when hard water of a poor water quality with a high hardness level as the raw water W1 is used, the high-purity soft water W2 in which a hardness leakage level is suppressed to a maximum extent can be obtained.

With the water treatment system 1 according to the first embodiment, the high-purity soft water W2 can thus be constantly supplied to the RO membrane module 8. Therefore, in the water treatment system 1, the occurrence of precipitation of a silica scale and fouling in the RO membrane module 8 can be suppressed. Further, in the water treatment system 1, precipitation of a calcium carbonate scale can be stably suppressed, even when hard water of a poor water quality is used.

In the water treatment system 1 according to the first embodiment, the control unit 10 performs the temperature feedforward recovery rate control in parallel with the flow rate feedback water volume control. Therefore, in the water treatment system 1, precipitation of the silica scale in the RO membrane module 8 can be more securely suppressed while maximizing a recovery rate of the permeate water W5.

Second Embodiment

Figure 7:
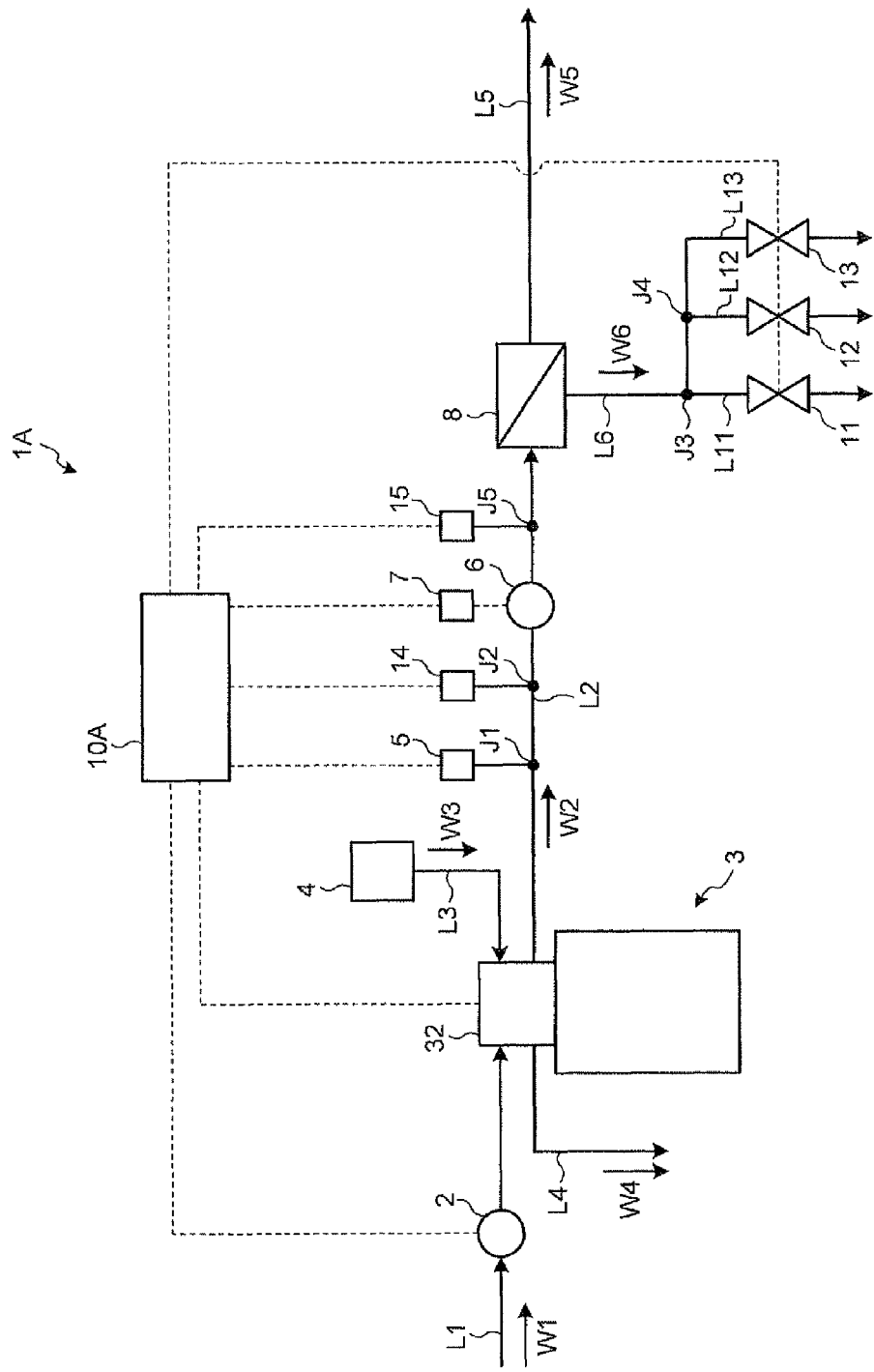
FIG. 7 is an exemplary overall configuration diagram of a water treatment system according to the second embodiment.

A water treatment system 1A according to a second embodiment of the present invention is described with reference to FIG. 7. FIG. 7 is an overall configuration diagram of the water treatment system 1A according to the second embodiment. In the second embodiment, differences from the first embodiment are mainly described. In a description of the second embodiment, configurations that are the same as or equivalent to those in the first embodiment are assigned with the same reference numerals or symbols. In the second embodiment, a description redundant with that of the first embodiment is suitably omitted.

As shown in FIG. 7, the water treatment system 1A according to the second embodiment includes the raw water pump 2, the water softening device 3, the salt water tank 4, the temperature sensor 5, the pressure tank 6, the inverter equipment 7, and the RO membrane module 8. The water treatment system 1A also includes a control unit 10A, the first drain valve 11 to the third drain valve 13, a hardness sensor 14 as a hardness measuring unit, and a pressure sensor 15 as a pressure detecting unit.

The hardness sensor 14 is a device that measures calcium hardness (a hardness leakage level: a calcium carbonate conversion value) of the soft water W2 that passes through the soft water line L2. The hardness sensor 14 is connected to the soft water line L2 at the junction portion J2. The hardness sensor 14 is electrically connected to the control unit 10A. Calcium hardness (hereinafter, also a "measured hardness value") of the soft water W2 measured by the hardness sensor 14 is transmitted to the control unit 10A as a detection signal.

The pressure sensor 15 is a device that detects a discharge pressure (operating pressure) of the pressure pump 6. The pressure sensor 15 is connected to the soft water line L2 at a junction portion J5 provided near a discharge side of the pressure pump 6. In the present embodiment, a pressure of the soft water W2 that is immediately after being discharged from the pressure pump 6 is assumed to be a discharge pressure of the pressure pump 6. The pressure sensor 15 is electrically connected to the control unit 10A. A pressure (hereinafter, also a "detected pressure value") of the soft water W2 detected by the pressure sensor 15 is transmitted to the control unit 10A as a detection signal.

The control unit 10A is configured by a microprocessor (not shown) that includes a CPU and a memory. The control unit 10A controls an operation of the process control valve 32 (see FIG. 2), based on detection signals that are input from a soft water flow rate sensor and a salt water flow rate sensor (both not shown). The memory of the control unit 10A stores in advance a control program for performing an operation of the water softening device 3 according to the second embodiment. The CPU controls the process control valve 32 to sequentially switch the softening process ST1 to the water supplementing process ST6, following the control program that is stored in the memory (see FIG. 3).

The control unit 10A calculates a drive frequency of the pressure pump 6, by using the detected pressure value of the pressure pump 6 as a feedback value, such that a flow rate of the permeate water W5 becomes a target flow rate value that is set in advance. The control unit 10A outputs a current value signal corresponding to the calculated value of a drive frequency to the inverter equipment 7 (hereinafter, also "pressure feedback water volume control").

Figure 8:
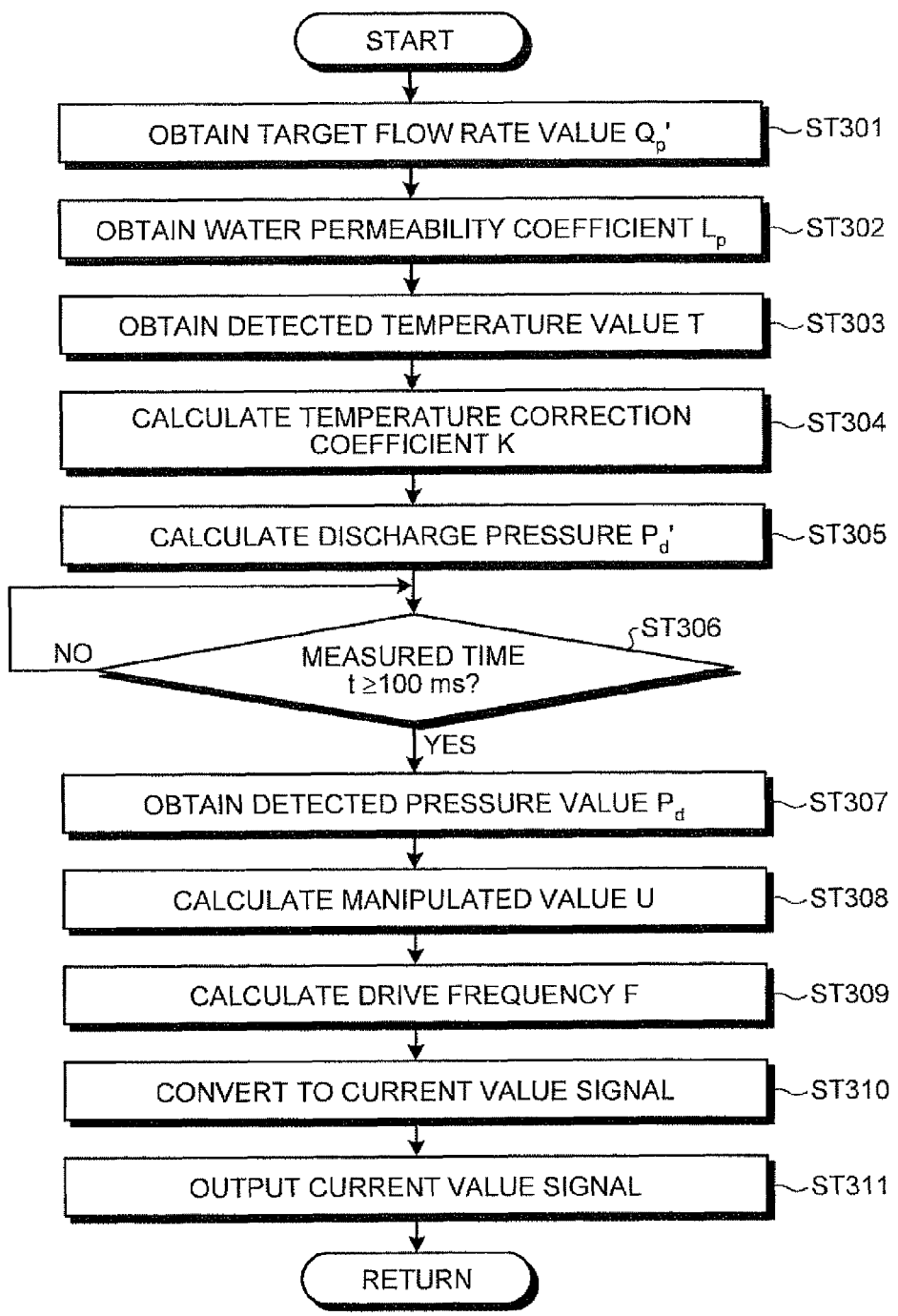
FIG. 8 is an exemplary flowchart showing a processing procedure employed when a control unit performs a pressure feedback water volume control in the embodiment.

The pressure feedback water volume control that is performed by the control unit 10A is described next. FIG. 8 is a flowchart showing a processing procedure employed when the control unit 10A performs a pressure feedback water volume control. The process of the flowchart shown in FIG. 8 is repeatedly performed during an operation of the water treatment system 1.

In step ST301 shown in FIG. 8, the control unit 10A obtains a target flow rate value $Q_p'$ of the permeate water W5. The target flow rate value $Q_p'$ is a set value that the system manager inputs to the memory via the user interface (not shown), for example.

In step ST302, the control unit 10A obtains a water permeability coefficient $L_p$ at a reference temperature (25° C.) of the RO membrane module 8. The water permeability coefficient $L_p$ is a set value that the system manger inputs to the memory via the user interface (not shown), for example.

The pressure feedback water volume control can be performed as a backup of the flow rate feedback water volume control according to the first embodiment. In this case, the water permeability coefficient $L_p$ may be a calculated value immediately before the occurrence of a fault of the flow rate sensor 9 (see FIG. 1).

A calculated value of the water permeability coefficient $L_p$ at the reference temperature can be obtained by the following Equations (3) and (4).

$$L_p = Q_p/(K \cdot A \cdot P_e) \tag{3}$$

(K: temperature correction coefficient, A: membrane area of the RO membrane module 8, $P_e$: effective pressure).

$$P_e = P_d - (\Delta P_1/2) - P_2 - \Delta\pi + P_s \tag{4}$$

(Pd: discharge pressure of the pressure pump 6, $\Delta P_1$: differential pressure at a primary side of the RO membrane module 8; $P_2$: back pressure at a secondary side of the RO membrane module 8, $\Delta\pi$: osmotic pressure difference of the RO membrane module 8, $P_s$: pressure at an intake side of the pressure pump 6).

In Equation (3), the temperature correction coefficient K is a function of the detected temperature value T of the temperature sensor 5. Because the membrane area A is determined by the number of reverse osmosis membrane elements, a preset value can be used. In the calculation of the effective pressure $P_e$ by Equation (4), each value of $\Delta P_1$, $P_2$, $\Delta\pi$, and $P_s$ can be regarded as substantially constant during a normal operation, and therefore, a preset value can be used. Therefore, the water permeability coefficient $L_p$ at the reference temperature can be calculated, by obtaining at least three parameters including the detected temperature value T of the temperature sensor 5, the detected flow rate value $Q_p$ of the flow rate sensor 9, and the detected pressure value $P_d$ of the pressure sensor 15, during an operation of the membrane separation device.

In step ST303, the control unit 10A obtains the detected temperature value T of the soft water W2 that is detected by the temperature sensor 5.

In step ST304, the control unit 10A calculates the temperature correction coefficient K, based on the detected temperature value T obtained in step ST303.

In step ST305, the control unit 10A calculates the discharge pressure $P_d'$ of the pressure pump 6, based on Equations (3) and (4) above, by using the target flow rate value $Q_p'$, the water permeability coefficient $L_p$, the temperature correction coefficient K that are obtained or calculated in the preceding step, and required set values (A, $\Delta P_1$, $P_2$, $\Delta\pi$, $P_s$). The control unit 10A sets a calculated value of discharge pressure $P_d'$ as a target pressure value.

In step ST306, the control unit 10A determines whether or not a time measured by an internal timer (not shown) has reached a control cycle of 100 ms. In step ST306, when the control unit 10A determines that a time measured by the timer has reached 100 ms (YES), the process proceeds to step ST307. In step ST306, when the control unit 10A determines that a time measured by the timer has not reached 100 ms (NO), the process returns to step ST306.

In step ST307 (step ST306; YES), the control unit 10A obtains the detected pressure value $P_d$ of the pressure pump 6 detected by the pressure sensor 15.

In step ST308, the control unit 10A calculates the manipulated value U by the speed type digital PID algorithm, such that a deviation between the detected pressure value (feedback value) $P_d$ that is obtained in step ST307 and the target pressure value $P_d'$ that is set in step ST305 becomes zero. In the speed type digital PID algorithm, a change portion of a manipulated value is calculated for each control cycle (100 ms), and this is added to an operation volume of a last time, thereby deciding a manipulated value of this time.

In step ST309, the control unit 10A calculates a drive frequency F of the pressure pump 6, based on the manipulated value U, the target pressure value $P_d$, and a maximum drive frequency (set value of 50 Hz or 60 Hz) of the pressure pump 6.

In step ST310, the control unit 10A converts the calculated value of the drive frequency F into a corresponding current value signal (4 to 20 mA).

In step ST311, the control unit 10A outputs the converted current value signal to the inverter equipment 7. Accordingly, the process of the present flowchart ends (the process returns to step ST301).

The control unit 10A performs a recovery rate control of the permeate water W5, based on hardness the soft water W2 (hereinafter, also "water quality feedforward recovery rate control"). The water quality feedforward recovery rate control is performed in parallel with the pressure feedback water volume control.

Figure 9:
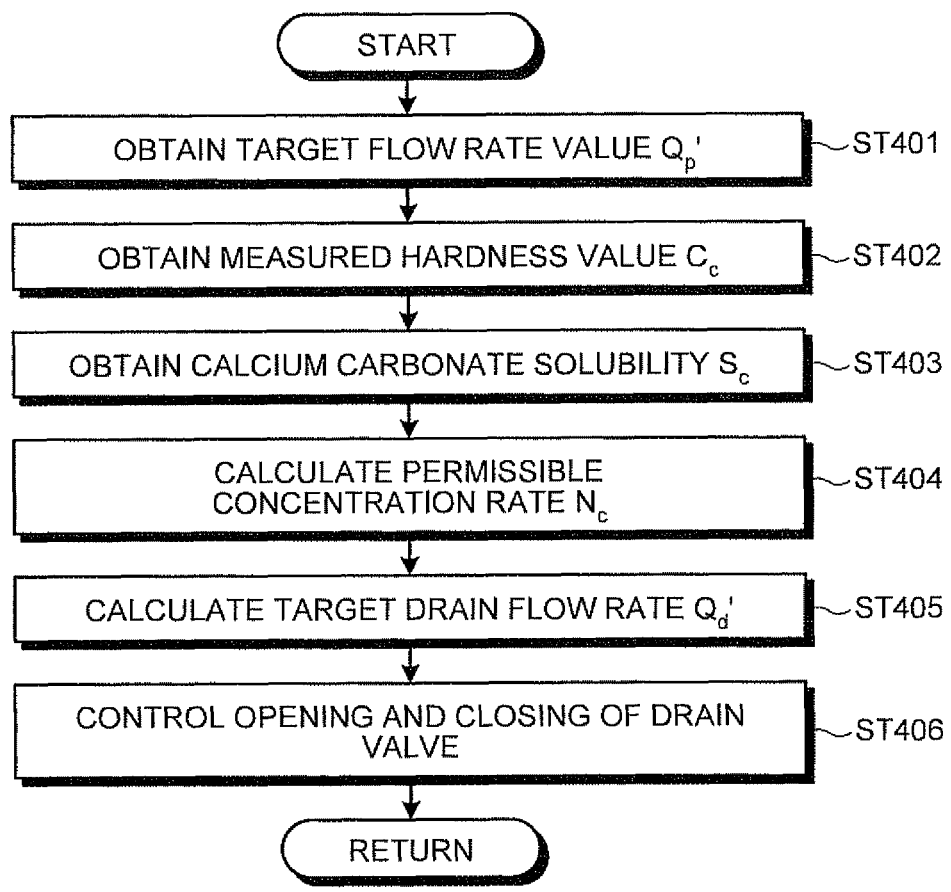
FIG. 9 is an exemplary flowchart showing a processing procedure employed when the control unit performs a water quality feedforward recovery rate control in the embodiment.

The water quality feedforward recovery rate control by the control unit 10A is described next. FIG. 9 is a flowchart showing a processing procedure employed when the control unit 10A performs the water quality feedforward recovery rate control. The process of the flowchart shown in FIG. 9 is repeatedly performed during an operation of the water treatment system 1.

In step ST401 shown in FIG. 9, the control unit 10A obtains the target flow rate value $Q_p'$ of the permeate water W5. The target flow rate value $Q_p'$ is a set value that the system manger inputs to the memory via the user interface (not shown), for example.

In step ST402, the control unit 10A obtains a measured hardness value $C_c$ of the soft water W2 measured by the hardness sensor 14.

In step ST403, the control unit 10A obtains calcium carbonate solubility $S_c$ in water. The calcium carbonate solubility $S_c$ is a set value that the system manger inputs to the memory via the user interface (not shown), for example. The calcium carbonate solubility in water can be regarded as substantially constant during a normal operation temperature (5 to 35° C.).

In step ST404, the control unit 10A calculates a permissible concentration rate $N_c$ of calcium carbonate in the concentrated water W6, based on the measured hardness value $C_c$ and the calcium carbonate solubility $S_c$ that are obtained in the preceding step. The permissible concentration rate $N_c$ of calcium carbonate can be obtained by the following Equation (5).

$$N_c = S_c/C_c \qquad (5)$$

For example, when the measured hardness value $C_c$ is 3 mgCaCO$_3$/L and also when the calcium carbonate solubility $S_c$ at 25° C. is 15 mgCaCO$_3$/L, the permissible concentration rate $N_c$ becomes "5".

In step ST405, the control unit 10A calculates a drain flow rate (target drain flow rate $Q_d'$) at which a recovery rate becomes a maximum, based on the target flow rate value $Q_p'$ and the permissible concentration rate $N_c$ that are obtained or calculated in the preceding step. The target drain flow rate $Q_d'$ can be obtained by the following Equation (6).

$$Q_d' = Q_p'/(N_c - 1) \qquad (6)$$

In step ST406, the control unit 10A controls opening and closing of the first drain valve 11 to the third drain valve 13 such that an actual drain flow rate $Q_d$ of the concentrated water W6 becomes the target drain flow rate $Q_d'$ calculated in step ST405. Accordingly, the process of the present flowchart ends (the process returns to step ST401).

With the water treatment system 1A according to the second embodiment, effect similar to that in the first embodiment is obtained. Particularly, in the water treatment system 1A according to the second embodiment, the control unit 10A controls a flow rate of the permeate water W5 by the pressure feedback water volume control. The pressure feedback water volume control can be performed as a backup of the flow rate feedback water volume control according to the first embodiment. Therefore, during the flow rate feedback water volume control according to the first embodiment, even when a fault occurs in the flow rate sensor 9 (see FIG. 1), the permeate water W5 of a stable water volume can be produced by switching the control to the pressure feedback water volume control according to the second embodiment.

In the water treatment system 1A according to the second embodiment, the control unit 10A performs the water quality feedforward recovery rate control. Therefore, in the water treatment system 1A, even when a hardness leakage level increases due to a regeneration failure and the like of the water softening device 3, precipitation of a calcium carbonate scale in the RO membrane module 8 can be more securely suppressed while maximizing a recovery rate of the permeate water W5.

Third Embodiment

Figure 10:
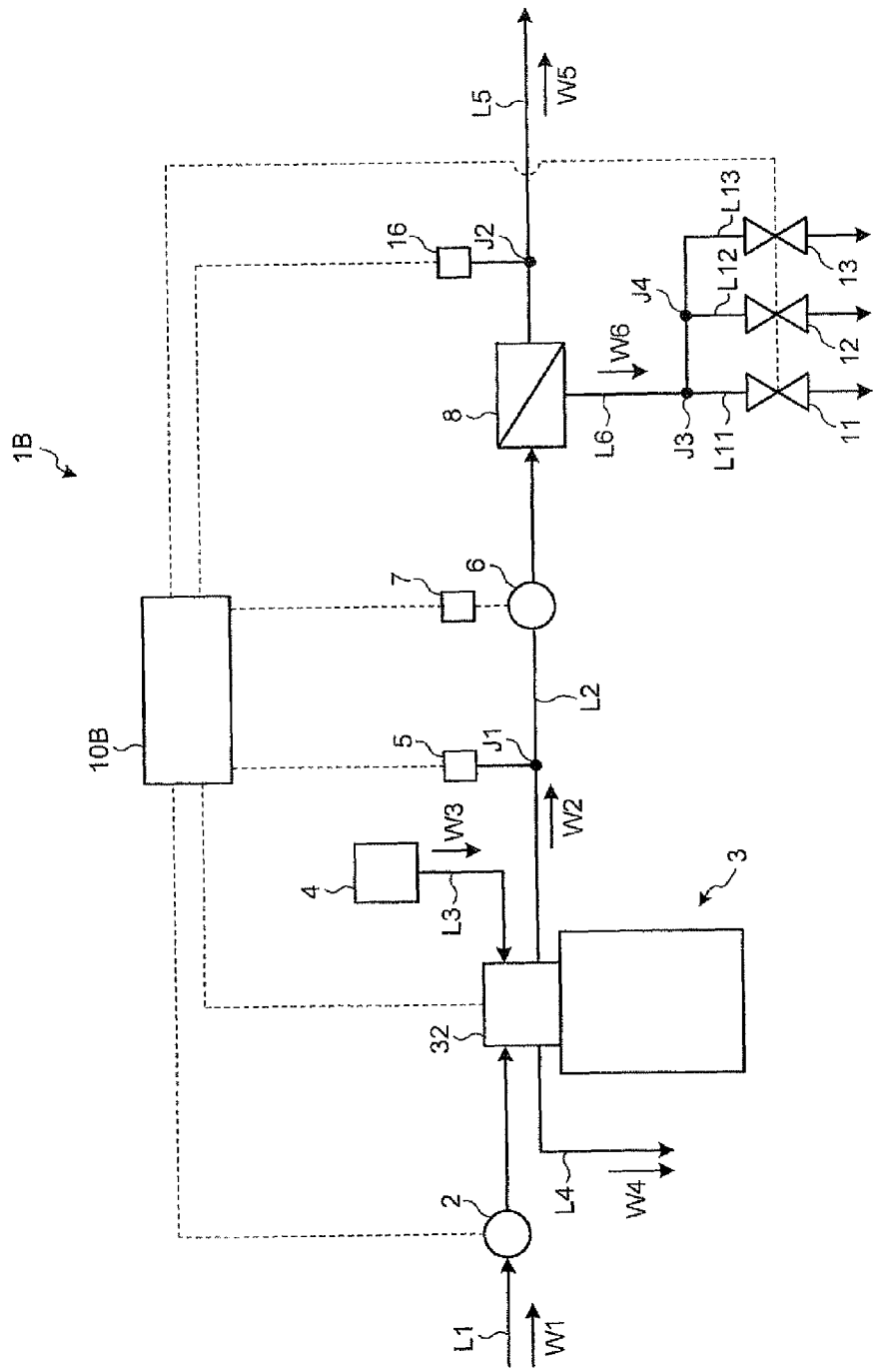
FIG. 10 is an exemplary overall configuration diagram of a water treatment system according to a third embodiment.

A water treatment system 1B according to a third embodiment of the present invention is described with reference to FIG. 10. FIG. 10 is an overall configuration diagram of the water treatment system 1B according to the third embodiment. In the third embodiment, differences from the first embodiment are mainly described. In a description of the third embodiment, configurations that are the same as or equivalent to those in the first embodiment and the second embodiment are assigned with the same reference numerals or symbols. In the third embodiment, a description redundant with that of the first embodiment and the second embodiment is suitably omitted.

As shown in FIG. 10, the water treatment system 1B according to the third embodiment includes the raw water pump 2, the water softening device 3, the salt water tank 4, the temperature sensor 5, the pressure pump 6, the inverter equipment 7, and the RO membrane module 8. The water treatment system 1B also includes a control unit 10B, the first drain valve 11 to the third drain valve 13, and an electric conductivity sensor 16 as an electric conductivity measuring unit.

The electric conductivity sensor 16 is a device that measures electric conductivity of the permeate water W5 that passes through the permeate water line L5. The electric conductivity sensor 16 is connected to the permeate water line L5 at the junction portion J2. The electric conductivity sensor 16 is electrically connected to the control unit 10B. Electric conductivity (hereinafter, also a "measured electric conductivity value") of the permeate water W5 measured by the electric conductivity sensor 16 is transmitted to the control unit 10B as a detection signal.

The control unit 10B is configured by a microprocessor (not shown) that includes a CPU and a memory. The control unit 10B controls an operation of the process control valve 32 (see FIG. 2), based on detection signals that are input from a soft water flow rate sensor and a salt water flow rate sensor (both not shown). The memory of the control unit 10B stores in advance a control program for performing an operation of the water softening device 3 according to the third embodiment. The CPU controls the process control valve 32 to sequentially switch the softening process ST1 to the water supplementing process ST6, following the control program that is stored in the memory (see FIG. 3).

The control unit 10B calculates a drive frequency of the pressure pump 6, by using the detected temperature value of the temperature sensor 5 as a feedforward value, such that a flow rate of the permeate water W5 becomes a target flow rate value that is set in advance. The control unit 10B outputs a current value signal corresponding to the calculated value of a drive frequency to the inverter equipment 7 (hereinafter, also "temperature feedforward water volume control").

Figure 11:
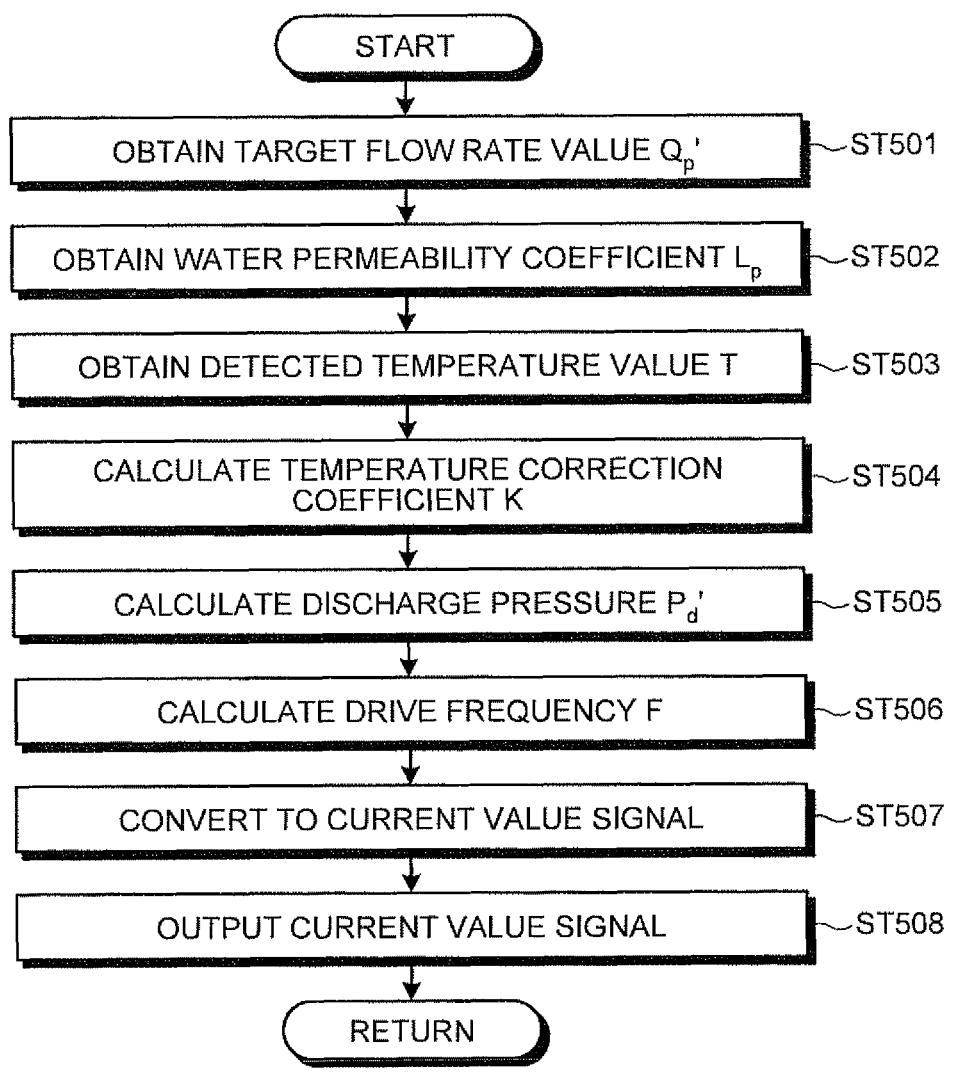
FIG. 11 is an exemplary flowchart showing a processing procedure employed when the control unit performs a temperature feedforward water volume control in the embodiment.

The temperature feedforward water volume control that is performed by the control unit 10B is described next. FIG. 11 is a flowchart showing a processing procedure employed when the control unit 10B performs the temperature feedforward water volume control. The process of the flowchart shown in FIG. 11 is repeatedly performed during an operation of the water treatment system 1.

In step ST501 shown in FIG. 11, the control unit 10B obtains a target flow rate value $Q_p{}'$ of the permeate water W5. The target flow rate value $Q_p{}'$ is a set value that the system manager inputs to the memory via the user interface (not shown), for example.

In step ST502, the control unit 108 obtains a water permeability coefficient $L_p$ at a reference temperature (25° C.) of the RO membrane module 8. The water permeability coefficient $L_p$ is a set value that the system manger inputs to the memory via the user interface (not shown), for example.

The temperature feedforward water volume control can be performed as a backup of the flow rate feedback water volume control according to the first embodiment. In this case, the water permeability coefficient $L_p$ can be a calculated value immediately before the occurrence of a fault of the flow rate sensor 9 (see FIG. 1). The water permeability coefficient $L_p$ at the reference temperature can be calculated by a method described in the second embodiment.

In step ST503, the control unit 10B obtains the detected temperature value T of the soft water W2 detected by the temperature sensor 5.

In step ST504, the control unit 10B calculates the temperature correction coefficient K, based on the detected temperature value T obtained in step ST503.

In step ST505, the control unit 10B calculates the discharge pressure $P_d{}'$ of the pressure pump 6, based on Equations (3) and (4) described in the second embodiment, by using the target flow rate value $Q_p{}'$, the water permeability coefficient $L_p$, the temperature correction coefficient K that are obtained or calculated in the preceding step, and required set values (A, $\Delta P_1$, $P_2$, $\Delta \pi$, $P_s$).

In step ST506, the control unit 10B calculates the drive frequency F of the pressure pump 6, based on the following Equation (7), by using the calculated value of the discharge pressure $P_a{}'$.

$$F = a \cdot P_d{'}^2 + b \cdot P_d{'} + c \quad (7)$$

(a, b, c: coefficients determined by specification of the pressure pump 6)

In step ST507, the control unit 10B converts the calculated value of the drive frequency F into a corresponding current value signal (4 to 20 mA).

In step ST508, the control unit 103 outputs the converted current value signal to the inverter equipment 7. Accordingly, the process of the present flowchart ends (the process returns to step ST501).

The control unit 10B performs a recovery rate control of the permeate water W5, based on electric conductivity of the permeate water W5 (hereinafter, also "water quality feedback recovery rate control"). The water quality feedback recovery rate control is performed in parallel with the temperature feedforward water volume control.

Figure 12:
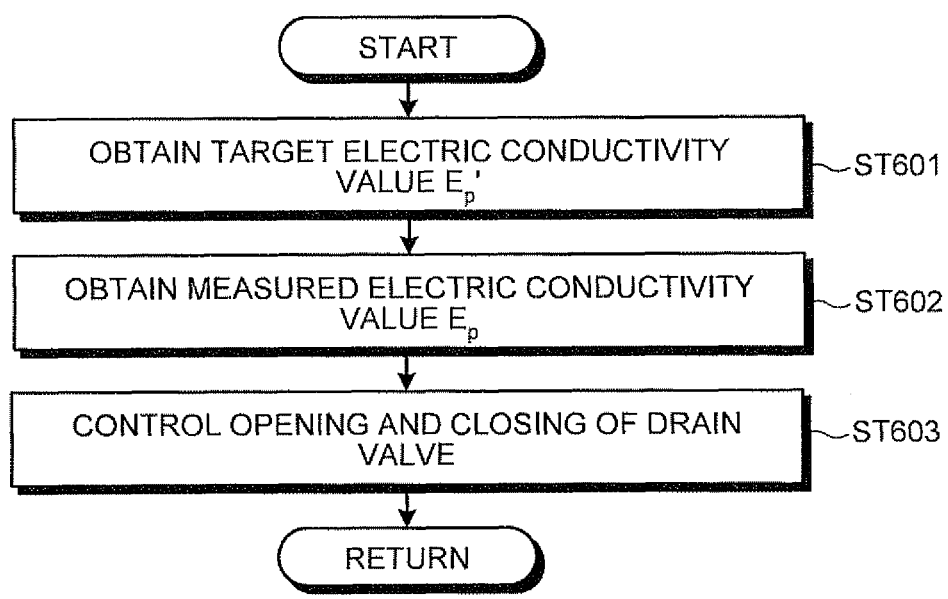
FIG. 12 is an exemplary flowchart showing a processing procedure employed when the control unit performs a water quality feedback recovery rate control in the embodiment.

The water quality feedback recovery rate control by the control unit 10B is described next. FIG. 12 is a flowchart showing a processing procedure employed when the control unit 10B performs the water quality feedback recovery rate control. The process of the flowchart shown in FIG. 12 is repeatedly performed during an operation of the water treatment system 1.

In step ST601 shown in FIG. 12, the control unit 10B obtains a target electric conductivity value $E_p{}'$ of the permeate water W5. The target electric conductivity value $E_p{}'$ is an index of purity that is required in the permeate water W5. The target electric conductivity value $E_p{}'$ is a set value that the system manger inputs to the memory via the user interface (not shown), for example.

In step ST602, the control unit 10B obtains a measured electric conductivity value $E_p$ of the permeate water W5 measured by the electric conductivity sensor 16.

In step ST603, the control unit 10B controls opening and closing of the first drain valve 11 to the third drain valve 13, such that a deviation between the measured electric conductivity value (feedback value) $E_p$ that is obtained in step ST602 and the target electric conductivity value $E_p{}'$ that is obtained in step ST301 becomes zero. That is, by increasing and decreasing at stages the drain flow rate of the concentrated water W6, concentration of dissolved salt on a membrane surface is changed such that the permeate water W5 of required purity is obtained. Accordingly, the process of the present flowchart ends (the process returns to step ST601).

According to the water treatment system 1B according to the third embodiment, effect similar to that in the first embodiment is obtained. Particularly, in the water treatment system 13 according to the third embodiment, a flow rate of the permeate water W5 is controlled by the temperature feedforward water volume control. The temperature feedforward water volume control can be performed as a backup of the flow rate feedback water volume control according to the first embodiment. Therefore, during the flow rate feedback water volume control according to the first embodiment, even when a fault occurs in the flow rate sensor 9 (see FIG. 1), the permeate water W5 of a stable water volume can be produced by switching the control to the temperature feedforward water volume control according to the third embodiment.

In the water treatment system 1B according to the third embodiment, the control unit 10B performs the water quality feedforward recovery rate control. Therefore, in the water treatment system 1B, a recovery rate of the permeate water W5 can be maximized while satisfying a water quality that is required in the permeate water W5.

The preferred embodiments of the present invention are described above. However, the present invention is not limited to the above embodiments, and can be performed by various modes.

In the first embodiment, for example, in the temperature feedforward recovery rate control, an example of obtaining silica concentration of the soft water W2 is described. Alternatively, silica concentration of the raw water W1 may be obtained.

In the second embodiment, in the water quality feedforward recovery rate control, an example of calculating a drain flow rate at which a recovery rate becomes a maximum is described based on the permissible concentration rate of calcium carbonate and the target flow rate value of the permeate water W5. Alternatively, the following method may be employed. That is, the permissible concentration rate $N_c$ of calcium carbonate and the permissible concentration rate $N_s$ of silica are compared, and a smaller permissible concentration rate is selected. Based on the selected permissible concentration rate and the target flow rate value of the permeate water W5, a drain flow rate at which a recover rate becomes a maximum is calculated.

In the first to third embodiments, examples of detecting a temperature of the soft water W2 supplied to the RO membrane module 8 are described. Alternatively, a temperature of the permeate water W5 obtained in the RO membrane module 8 may be detected. Further, a temperature of the concentrated water W6 obtained in the RO membrane module 8 may be detected.

In the first to third embodiments, in each recovery rate control, examples of adjusting at stages a drain flow rate of the concentrated water W6 by selectively opening and closing the first drain valve 11 to the third drain valve 13 are described. Alternatively, a proportional control valve may be provided in the concentrated water line L6. A drain flow rate of the concentrated water W6 can be adjusted by controlling a valve aperture by transmitting a current value signal (4 to 20 mA, for example) from the control unit to the proportional control valve.

In a configuration in which the proportional control valve is provided, a flow rate sensor may be provided in the concentrated water line L6. A flow rate value that is detected by the flow rate sensor is input to the control unit as a feedback value. Accordingly, an actual drain flow rate of the concentrated water W6 can be controlled more accurately.

In the first embodiment, an example that the flow rate feedback water volume control and the temperature feedforward recovery rate control are combined is described. Alternatively, the pressure feedback water volume control and the temperature feedforward recovery rate control in the second embodiment may be combined. Further, the temperature feedforward water volume control and the temperature feedforward recovery rate control in the third embodiment may be combined.

In the second embodiment, an example that the pressure feedback water volume control and the water quality feedback recovery rate control are combined is described. Alternatively, the flow rate feedback water volume control and the water quality feedforward recovery rate control in the first embodiment may be combined. Further, the temperature feedforward water volume control and the water quality feedforward recovery rate control in the third embodiment may be combined.

In the third embodiment, an example that the temperature feedforward water volume control and the water quality feedback recovery rate control are combined is described. Alternatively, the flow rate feedback water volume control and the water quality feedback recovery rate control in the first embodiment may be combined. Further, the pressure feedback water volume control and the water quality feedback recovery rate control in the second embodiment may be combined.

What is claimed is:

1. A water treatment system, comprising:
a water softening device configured to produce soft water having a hardness of equal to or lower than 0.8 mg $CaCO_3$/L from raw water having a hardness of equal to or lower than 500 mg $CaCO_3$/L; and
a membrane separation device configured to produce permeate water from the soft water, wherein:
the water softening device comprises a pressure tank including a top portion screen, an intermediate portion screen, and a bottom portion screen, the pressure tank having:
a supporting bed provided in association with the bottom portion screen, including filtration gravel so as to filter soft water and a regenerant; and
a cation exchange resin bed to which the raw water or the regenerant is supplied, the cation exchange resin bed having a depth D1, and the cation exchange resin bed being provided on the supporting bed in association with the intermediate portion screen,
a valve unit configured to switch between a softening process in which the soft water is obtained by passing the raw water through the cation exchange resin bed downward while supplying the raw water from the top portion screen, and the obtained water is filtered through the supporting bed and collected from the bottom portion screen, and a regeneration process in which the cation exchange resin bed is regenerated by generating an opposite flow of the regenerant by supplying a first portion of the regenerant from the top screen portion and a second portion of the regenerant from the bottom screen portion while filtering with the supporting bed and collecting a liquid at the intermediate portion, and
a regenerant supply unit configured to supply the regenerant in a volume which gives a regeneration level of 1 to 6 eq/L-R, with respect to the cation exchange resin bed, in the regeneration process; and
the membrane separation device comprises:
a reverse osmosis membrane module configured to separate the soft water into the permeate water and concentrated water;
a pressure pump configured to be driven at a rotation speed corresponding to an input drive frequency and to intake the soft water to discharge the soft water toward the reverse osmosis membrane module;
an inverter equipment configured to output the drive frequency corresponding to an input current value signal to the pressure pump; and
a control unit configured to calculate the drive frequency of the pressure pump by using a physical quantity in the water treatment system such that a flow rate of the permeate water becomes a preset target flow rate value and to output a current value signal corresponding to a calculated value of the drive frequency to the inverter equipment;
a bottom portion of the cation exchange resin bed is regenerated in the regeneration process, the bottom portion having a depth D2 corresponding to $D1/15<D2<D1/3$ with respect to the depth D1 of the cation exchange resin bed; and
the reverse osmosis membrane module includes a reverse osmosis membrane on a surface of which a skin layer of a negative electric characteristic made of a bridged wholly aromatic polyamide is formed, the reverse osmosis membrane having a water permeability coefficient of $1.5 \times 10^{-11}$ $m^3 \cdot m^{-2} \cdot s^{-1} \cdot Pa^{-1}$ or higher when a sodium chloride aqueous solution of concentration 500 mg/L, pH 7.0, and a temperature 25° C. is supplied at an operating pressure 0.7 MPa and a recovery rate 15%.

2. The water treatment system according to claim 1, wherein:
the membrane separation device further comprises a flow rate detecting unit configured to detect a flow rate of the permeate water, and the control unit is configured to:
(i) calculate the drive frequency of the pressure pump by a speed type digital PID algorithm such that a detected flow rate value of the flow rate detecting unit becomes the preset target flow rate value; and
(ii) output a calculated value signal corresponding: to a calculated value of the drive frequency to the inverter equipment.

3. The water treatment system according to claim 1, wherein:
the membrane separation device further comprises:
a pressure detecting unit configured to detect a discharge pressure of the pressure pump, and
a temperature detecting unit configured to detect a temperature of the soft water, the permeate water, or the concentrated water, and
the control unit is configured to:
(i) calculate a discharge pressure of the pressure pump based on a detected temperature value of the temperature detecting unit, a water permeability coefficient at a reference temperature of the reverse osmosis membrane module, and the preset target flow rate value;
(ii) set a calculated value of the discharge pressure as a target pressure value;
(iii) calculate the drive frequency of the pressure pump by a speed type digital PID algorithm such that a detected pressure value of the pressure detecting unit becomes the target pressure value; and
(iv) output a calculated value signal corresponding to a calculated value of the drive frequency to the inverter equipment.

4. The water treatment system according to claim 1, wherein:
the membrane separation device further comprises a temperature detecting unit configured to detect a temperature of the soft water, the permeate water, or the concentrated water, and
the control unit is configured to:
(i) calculate a discharge pressure of the pressure pump based on a detected temperature value of the temperature detecting unit, a water permeability coefficient value at a reference temperature of the reverse osmosis membrane module, and the preset target flow rate value;
(ii) calculate the drive frequency of the pressure pump based on a calculated value of the discharge pressure; and
(iii) output a calculated value signal corresponding to a calculated value of the drive frequency to the inverter equipment.

5. The water treatment system according to claim 1, wherein:
the membrane separation device further comprises:
a temperature detecting unit configured to detect a temperature of the soft water, the permeate water, or the concentrated water, and
a drain valve configured to adjust a drain flow rate of the concentrated water that is drained to an outside of the membrane separation device, and the control unit is configured to:
(i) calculate a permissible concentration rate of silica in the concentrated water based on silica concentration of the raw water or the soft water obtained in advance and silica solubility determined by a detected temperature value of the temperature detecting unit;
(ii) calculate the drain flow rate based on a calculated value of the permissible concentration rate and the preset target flow rate value of the permeate water; and
(iii) control the drain valve such that an actual drain flow rate of the concentrated water becomes a calculated value of the drain flow rate.

6. The water treatment system according to claim 2, wherein:
the membrane separation device further comprises:
a temperature detecting unit configured to detect a temperature of the soft water, the permeate water, or the concentrated water, and
a drain valve configured to adjust a drain flow rate of the concentrated water that is drained to an outside of the membrane separation device, and
the control unit is configured to:
(i) calculate a permissible concentration rate of silica in the concentrated water based on silica concentration of the raw water or the soft water obtained in advance and silica solubility determined by a detected temperature value of the temperature detecting unit;
(ii) calculate the drain flow rate based on a calculated value of the permissible concentration rate and the preset target flow rate value of the permeate water; and
(iii) control the drain valve such that an actual drain flow rate of the concentrated water becomes a calculated value of the drain flow rate.

7. The water treatment system according to claim 3, wherein:
the membrane separation device further comprises:
a temperature detecting unit configured to detect a temperature of the soft water, the permeate water, or the concentrated water, and
a drain valve configured to adjust a drain flow rate of the concentrated water that is drained to an outside of the membrane separation device, and
the control unit is configured to:
(i) calculate a permissible concentration rate of silica in the concentrated water based on silica concentration of the raw water or the soft water obtained in advance and silica solubility determined by a detected temperature value of the temperature detecting unit;
(ii) calculate the drain flow rate based on a calculated value of the permissible concentration rate and the preset target flow rate value of the permeate water; and
(iii) control the drain valve such that an actual drain flow rate of the concentrated water becomes a calculated value of the drain flow rate.

8. The water treatment system according to claim 4, wherein:
the membrane separation device further comprises:
a temperature detecting unit configured to detect a temperature of the soft water, the permeate water, or the concentrated water, and
a drain valve configured to adjust a drain flow rate of the concentrated water that is drained to an outside of the membrane separation device, and
the control unit is configured to:
(i) calculate a permissible concentration rate of silica in the concentrated water based on silica concentration of the raw water or the soft water obtained in advance and silica solubility determined by a detected temperature value of the temperature detecting unit;

(ii) calculate the drain flow rate based on a calculated value of the permissible concentration rate and the preset target flow rate value of the permeate water; and (iii) control the drain valve such that an actual drain flow rate of the concentrated water becomes a calculated value of the drain flow rate.

9. The water treatment system according to claim 1, wherein:

the membrane separation device further comprises:
   a hardness measuring unit configured to measure calcium hardness of the soft water, and
   a drain valve configured to adjust a drain flow rate of the concentrated water that is drained to an outside of the membrane separation device, and the control unit is configured to:
   (i) calculate a permissible concentration rate of calcium carbonate in the concentrated water based on calcium carbonate solubility obtained in advance and a measured hardness value of the hardness measuring unit;
   (ii) calculate a drain flow rate based on a calculated value of the permissible concentration rate and the preset target flow rate value of the permeate water; and
   (iii) control the drain valve such that an actual drain flow rate of the concentrated water becomes a calculated value of the drain flow rate.

10. The water treatment system according to claim 2, wherein:

the membrane separation device further comprises:
   a hardness measuring unit configured to measure calcium hardness of the soft water, and
   a drain valve configured to adjust a drain flow rate of the concentrated water that is drained to an outside of the membrane separation device, and the control unit is configured to:
   (i) calculate a permissible concentration rate of calcium carbonate in the concentrated water based on calcium carbonate solubility obtained in advance and a measured hardness value of the hardness measuring unit;
   (ii) calculate a drain flow rate based on a calculated value of the permissible concentration rate and the preset target flow rate value of the permeate water; and
   (iii) control the drain valve such that an actual drain flow rate of the concentrated water becomes a calculated value of the drain flow rate.

11. The water treatment system according to claim 3, wherein:

the membrane separation device further comprises:
   a hardness measuring unit configured to measure calcium hardness of the soft water, and
   a drain valve configured to adjust a drain flow rate of the concentrated water that is drained to an outside of the membrane separation device, and the control unit is configured to:
   (i) calculate a permissible concentration rate of calcium carbonate in the concentrated water based on calcium carbonate solubility obtained in advance and a measured hardness value of the hardness measuring unit;
   (ii) calculate a drain flow rate based on a calculated value of the permissible concentration rate and the preset target flow rate value of the permeate water; and
   (iii) control the drain valve such that an actual drain flow rate of the concentrated water becomes a calculated value of the drain flow rate.

12. The water treatment system according to claim 4, wherein:

the membrane separation device further comprises:
   a hardness measuring unit configured to measure calcium hardness of the soft water, and
   a drain valve configured to adjust a drain flow rate of the concentrated water that is drained to an outside of the membrane separation device, and the control unit is configured to:
   (i) calculate a permissible concentration rate of calcium carbonate in the concentrated water based on calcium carbonate solubility obtained in advance and a measured hardness value of the hardness measuring unit;
   (ii) calculate a drain flow rate based on a calculated value of the permissible concentration rate and the preset target flow rate value of the permeate water; and
   (iii) control the drain valve such that an actual drain flow rate of the concentrated water becomes a calculated value of the drain flow rate.

13. The water treatment system according to claim 1, wherein:

the membrane separation device further comprises:
   an electric conductivity measuring unit configured to measure electric conductivity of the permeate water, and
   a drain valve configured to adjust a drain flow rate of the concentrated water that is drained to an outside of the membrane separation device, and the control unit is configured to control the drain flow rate from the drain valve such that a measured electric conductivity value of the electric conductivity measuring unit becomes a preset target electric conductivity value.

14. The water treatment system according to claim 2, wherein:

the membrane separation device further comprises:
   an electric conductivity measuring unit configured to measure electric conductivity of the permeate water, and
   a drain valve configured to adjust a drain flow rate of the concentrated water that is drained to an outside of the membrane separation device, and the control unit is configured to control the drain flow rate from the drain valve such that a measured electric conductivity value of the electric conductivity measuring unit becomes a preset target electric conductivity value.

15. The water treatment system according to claim 3, wherein:

the membrane separation device further comprises:
   an electric conductivity measuring unit configured to measure electric conductivity of the permeate water, and
   a drain valve configured to adjust a drain flow rate of the concentrated water that is drained to an outside of the membrane separation device, and the control unit is configured to control the drain flow rate from the drain valve such that a measured electric conductivity value of the electric conductivity measuring unit becomes a preset target electric conductivity value.

16. The water treatment system according to claim 4, wherein:

the membrane separation device further comprises:
   an electric conductivity measuring unit configured to measure electric conductivity of the permeate water, and
   a drain valve configured to adjust a drain flow rate of the concentrated water that is drained to an outside of the membrane separation device, and the control unit is configured to control the drain flow rate from the drain valve such that a measured electric conductivity value of the electric conductivity measuring unit becomes a preset target electric conductivity value.

17. The water treatment system according to claim 1, wherein:
the depth D1 of the cation exchange resin bed is within the range of 300 mm to 1500 mm, and
the depth D2 of the bottom potion is 100 mm.

* * * * *